United States Patent [19]

Kim

[11] Patent Number: 5,910,798
[45] Date of Patent: Jun. 8, 1999

[54] APPARATUS FOR MOVING A CURSOR ON A SCREEN

[75] Inventor: Yang-Hoon Kim, Kyungki-do, Rep. of Korea

[73] Assignee: LG Electronics Inc., Seoul, Rep. of Korea

[21] Appl. No.: 08/978,153

[22] Filed: Nov. 25, 1997

[30] Foreign Application Priority Data

Nov. 27, 1996 [KR] Rep. of Korea ............... 96-58117

[51] Int. Cl.⁶ ...................................................... G09G 5/08
[52] U.S. Cl. ........................ 345/163; 345/157; 345/159; 345/160
[58] Field of Search .................................. 345/163, 145, 345/159, 160, 157

[56] References Cited

U.S. PATENT DOCUMENTS

| | | | |
|---|---|---|---|
| 4,698,626 | 10/1987 | Sato et al. | 340/710 |
| 4,803,474 | 2/1989 | Kulp | 340/709 |
| 5,095,303 | 3/1992 | Clark et al. | 340/710 |
| 5,111,005 | 5/1992 | Smith et al. | 178/19 |
| 5,195,179 | 3/1993 | Tokunaga | 395/161 |
| 5,398,044 | 3/1995 | Hill | 345/145 |
| 5,469,191 | 11/1995 | Smith, III et al. | 345/157 |
| 5,485,171 | 1/1996 | Copper et al. | 345/160 |
| 5,565,887 | 10/1996 | McCambridge et al. | 345/145 |
| 5,661,502 | 8/1997 | Cheng | 345/145 |

*Primary Examiner*—Richard A. Hjerpe
*Assistant Examiner*—Henry Tran
*Attorney, Agent, or Firm*—Finnegan, Henderson, Farabow, Garrett & Dunner, L.L.P.

[57] ABSTRACT

An apparatus for moving a cursor finely on a screen moves the cursor in an application program such as a CAD that requires high accuracy. The apparatus includes a mouse button formed at a predetermined portion of a mouse for selecting data; fine movement buttons formed to predetermined portions around the mouse button for moving a mouse cursor upward, downward, left and right by a preset value; and a fine movement interval regulator formed to a predetermined place of the mouse button for providing a fine movement signal per preset time while a user presses the fine movement button.

5 Claims, 2 Drawing Sheets

APPARATUS FOR MOVING A CURSOR ON A SCREEN

BACKGROUND OF THE INVENTION

The present invention relates to a computer mouse or other similar input equipment. A conventional computer mouse input equipment is formed by, as shown in FIG. 1, a monitor 2 which is connected to a computer main body 1 for displaying images thereon and a mouse 3 which is connected to computer main body 1 and is furnished with a mouse button 3a that moves a cursor being displayed on monitor 2.

Once a user applies an electric power to computer main body 1 in the conventional computer mouse input equipment formed as above, the cursor appears on monitor 2. Then, when the user holds mouse 3 by the hand so as to move the cursor appearing on the screen of monitor 2 to a desired point, the cursor on the screen is moved to the corresponding point. After this, the user presses mouse button 3a provided at a predetermined portion of mouse 3 to output/input data by selecting data needed on the screen. By doing so, computer main body 1 executes the output/input operation of the selected data.

However, since the user manipulates the mouse by hand to move the cursor, the above-stated conventional mouse input equipment is disadvantageous in that the cursor cannot be finely and minutely moved in an application program such as a CAD that requires high accuracy.

SUMMARY OF THE INVENTION

Therefore, it is an object of the present invention to provide an apparatus for finely moving a cursor on a screen. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a first device for activating movement of the cursor from one position to another on the display screen by a first distance and a second device for activating the movement of the cursor by a second distance when the second device is activated.

BRIEF DESCRIPTION OF THE DRAWINGS

The above objects and other advantages of the present invention will become more apparent by describing in detail preferred embodiment thereof with reference to the attached drawings in which.

DETAILED DESCRIPTION OF THE PREFERRED EMBODIMENT

An apparatus for adjusting a computer cursor according to the present invention will now be described in detail with reference to accompanying drawings.

Figure 1:
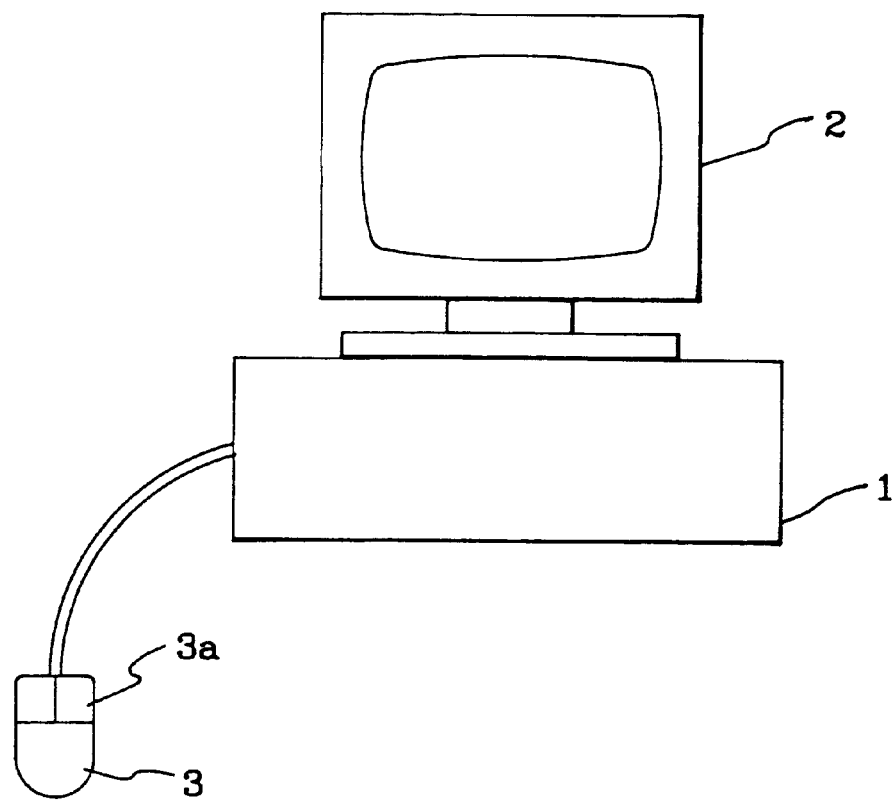
FIG. 1 is a view showing a conventional computer mouse input equipment.
Figure 2:
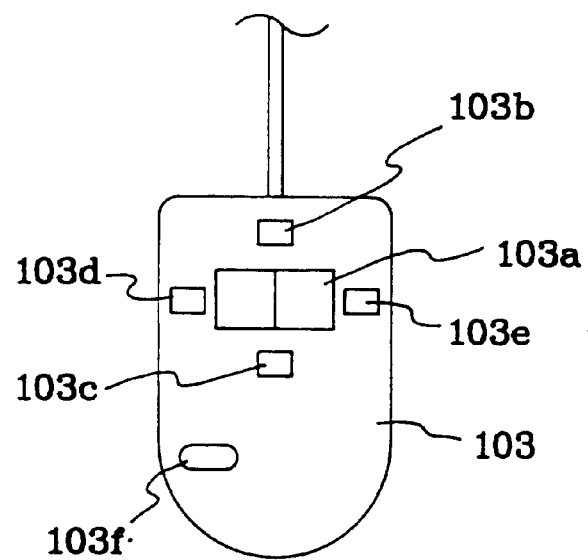
FIG. 2 is a view showing an apparatus for adjusting a computer cursor according to the present invention.

FIG. 2 illustrates an apparatus for moving the computer cursor according to the present invention. The apparatus for moving a cursor on a screen according to the present invention as shown in FIG. 2 is equipped with a mouse button 103a formed at a predetermined portion of a mouse 103 to select data; fine movement buttons 103b, 103c, 103d and 103e formed at predetermined portions adjacent to mouse button 103a to move a mouse cursor upward/downward and right/left as much as a preset value; and a fine movement interval regulator 103f formed at a predetermined position of mouse 103 for providing a fine movement signal for each preset time interval while a user presses fine movement button at least one among 103b, 103c, 103d or 103e.

Mouse button 103a generally operates in the same manner as in a conventional mouse. Upward fine movement button 103b moves the cursor upward as much as a minimum movement value (preset value) whenever being pressed, and downward fine movement button 103c moves the cursor downward as much as the minimum movement value whenever being pressed. Similarly, left fine movement button 103d moves the cursor left as much as the minimum movement value whenever being pressed, and right fine movement button 103e moves the cursor right as much as the minimum movement value whenever being pressed.

Once mouse 103 is moved by a predetermined amount, a mouse device converts the movement of mouse 103 into a signal recognizable by a computer and supplies the signal to a system to change the position of the cursor.

However, if the cursor is desired to be moved further, fine movement buttons 103b–103e must be repeatedly pressed for several times. To avoid such repetition, fine movement interval regulator 103f is employed in the present invention for supplying a fine movement signal to the system per time interval which is preset by fine movement interval regulator 103f when one of the fine movement buttons is continuously pressed. Thus, the cursor can be moved over a greater distance by pressing a fine movement button continuously for a longer period of time. Preferably, the fine movement signal is transmitted via a packet system. Additionally, the time interval of fine movement interval regulator 103f is controllable for the user's convenience. Preferably, the fine movement interval regulator may be a dial or sliding type switch.

Figure 3:
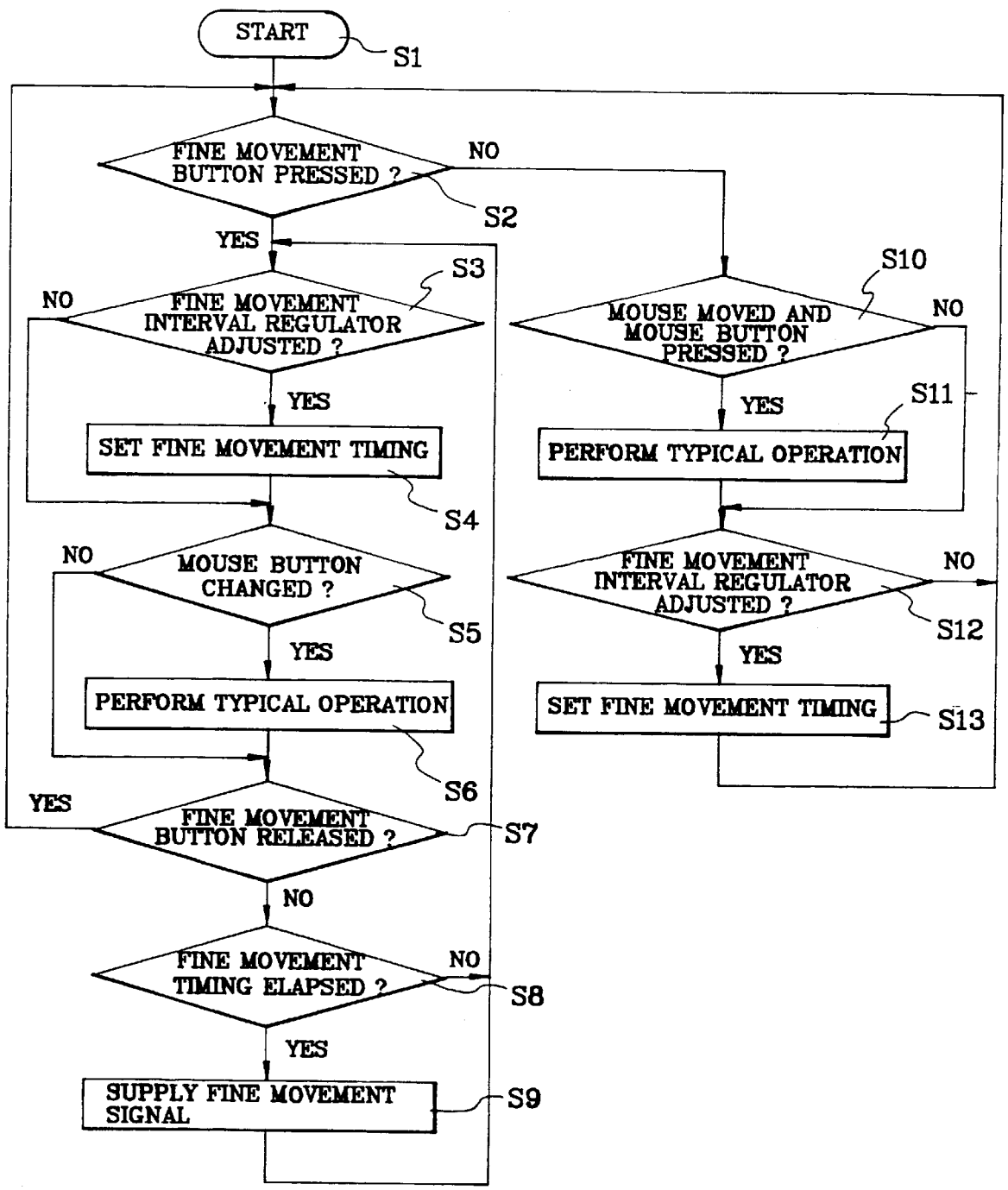
FIG. 3 is a flowchart showing an operation of the apparatus for adjusting the computer cursor according to the present invention.

One example of the operation of the apparatus for adjusting the computer cursor according to the present invention will be described in detail with reference to FIG. 3.

To begin with, once a user applies the electric power to computer main body 1, the cursor appears on the screen of monitor 2. Then, the user holds mouse 103 by the hand to move it in any direction so as to move the cursor appearing on the screen within monitor 2 to a desired point, so that the control procedure proceeds to step S1 that the cursor within monitor 2 is moved to the corresponding point.

In step S2, it is determined whether at least one among upward, downward, left and right fine movement buttons 103b, 103c, 103d and 103e is pressed or not. If it is decided that at least one button among upward, downward, left and right fine movement buttons 103b–103e is pressed in step S2, it is further determined whether fine movement interval regulator 103f is adjusted in view of the precision that is required in accordance with the details of the user's operation or not in step S3. More specifically, a fine movement distance value resulting from the fine movement signal provided from at least one button among upward, downward, left and right fine movement buttons 103b–103e, which is defaulted into a microprocessor, may be set to, e.g., 0.1 cm or 0.2 cm. However, if it is decided in step S3 that the fine movement distance value preset in accordance with the precision that is required in view of the details of the user's operation needs to be changed, the fine movement time interval preset by fine movement interval regulator 103*f* is changed to adjust the fine movement distance value in step S4, thereby proceeding to step S5. When it is decided in step S3 that the details of the user's operation requires no change in the fine movement distance value, the control procedure directly proceeds to step S5.

In step S5, it is determined whether, in order to selectively output or input the necessary data on the screen of monitor 2, the user presses mouse button 103*a* formed at the predetermined portion of mouse 103 or not. If it is decided that mouse button 103*a* is pressed in step S5, computer main body 1 performs the output/input operation of the selected data in step S6 to proceed to step S7. Unless the mouse button 103*a* is pressed in step S5, the control procedure directly proceeds to step S7.

In step S7, it is determined whether the pressed button among upward, downward, left and right fine movement buttons 103*b*–103*e* is released or not to proceed to step S2 when the pressed button among upward, downward, left and right fine movement buttons 103*b*–103*e* is released, thereby repeatedly determining whether the upward, downward, left or right fine movement button 103*b*, 103*c*, 103*d* or 103*e* is pressed or not. If the pressed button among upward, downward, left and right fine movement buttons 103*b*–103*e* is continuously pressed in step S7, control procedure proceeds to step S8.

In step S8, it is decided whether the preset fine movement time interval is elapsed or not to proceed to step S3 when the preset fine movement time interval is not elapsed, thereby repeatedly determining whether fine movement interval regulator 103*f* is adjusted or not. If the preset fine movement time interval has elapsed, the fine movement signal is transmitted in step S9. Then, control procedure proceeds to step S3 to determine whether fine movement interval regulator 103*f* is adjusted or not.

When it is decided that upward, downward, left and right fine movement buttons 103*b*–103*e* are not pressed in step S2, the control procedure proceeds to step S10 to determine the movement of mouse 103 and pressing of mouse button 103*a*. If it is decided that mouse 103 is moved and mouse button 103*a* is pressed in step S10, step S11 performs the normal operation identical to step S6, thereby proceeding to step S12. Unless mouse 103 is moved and mouse button 103*a* is pressed in step S10, the control procedure directly proceeds to step S12.

In step S12, it is also determined whether fine movement interval regulator 103*f* is adjusted in accordance with the precision that is required in view of the details of the user's operation or not. When it is decided that fine movement interval regulator 103*f* is adjusted in step S12, the fine movement time interval preset by fine movement interval regulator 103*f* is changed to adjust the fine movement distance value in step S13 identical to step S4, and the control procedure proceeds to step S2. If it is decided that there is no need to change the fine movement distance value in view of the details of user's operation in step S12, the control procedure directly proceeds to step S2.

As one example, if the user intends to move the cursor on monitor 2 downward by as much as 1 cm, downward fine movement button 103*c*(when fine movement distance value is set to 0.1 cm) must be pressed ten times. But, by the fine movement time interval set by fine movement interval regulator 103*f*, the cursor can be minutely moved automatically to continue the movement for each time interval set by fine movement interval regulator 103*f* while downward fine movement button 103*c* is being pressed.

Furthermore, the user can adjust the fine movement time interval for minutely and continuously moving the cursor on monitor 2 during pressing fine movement buttons 103*b*–103*e* by adjusting fine movement interval regulator 103*f*.

As a result, in the apparatus for adjusting the computer cursor according to the present invention, the fine movement buttons are installed to the predetermined portions of the mouse to be enough to minutely and accurately move the cursor in the application program such as the CAD that requires the high accuracy.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for moving a cursor on a display screen, comprising:

a first device for activating movement of the cursor from one position to another on the display screen by a first distance;

a second device for activating the movement of the cursor by a second distance smaller than the first distance when said second device is activated, wherein said second device includes one or more members, each member corresponding to a different direction of the movement of the cursor; and a third device for activating said second device in a predetermined time interval, said third device including means for setting said predetermined time interval.

2. The apparatus for moving a cursor on a display screen of claim 1, wherein said one or more members include four members, each member corresponding to a respective one of upward, downward, rightward and leftward directions of the movement of the cursor.

3. The apparatus for moving a cursor on a display screen of claim 1, wherein said means for setting said predetermined time interval includes a sliding switch for controlling said predetermined time interval.

4. The apparatus for moving a cursor on a display screen of claim 1, wherein said means for setting said predetermined time interval includes a dial switch for controlling said predetermined time interval.

5. An apparatus for moving a cursor on a display screen, comprising:

a first device for activating movement of the cursor from one position to another on the display screen by a first distance; and a second device for activating the movement of the cursor by a second distance smaller than the first distance when said second device is activated, wherein said second device includes one or more members, each member corresponding to a different direction of the movement of the cursor.

* * * * *